(12) United States Patent
Klumpner

(10) Patent No.: US 10,393,201 B2
(45) Date of Patent: Aug. 27, 2019

(54) ACTUATING DEVICE FOR AN INTERNAL SHOE BRAKE HAVING AN AUTOMATIC ADJUSTING DEVICE

(71) Applicant: KNOTT GMBH, Eggstätt (DE)

(72) Inventor: Andreas Klumpner, St. Georgen (DE)

(73) Assignee: KNOTT GMBH, Eggstätt (DE)

( * ) Notice: Subject to any disclaimer, the term of this patent is extended or adjusted under 35 U.S.C. 154(b) by 0 days.

(21) Appl. No.: 15/512,880

(22) PCT Filed: Sep. 16, 2015

(86) PCT No.: PCT/EP2015/001854
§ 371 (c)(1),
(2) Date: Mar. 21, 2017

(87) PCT Pub. No.: WO2016/045776
PCT Pub. Date: Mar. 31, 2016

(65) Prior Publication Data
US 2017/0248184 A1    Aug. 31, 2017

(30) Foreign Application Priority Data

Sep. 24, 2014 (DE) .................. 10 2014 013 868

(51) Int. Cl.
*F16D 51/16* (2006.01)
*F16D 65/56* (2006.01)
(Continued)

(52) U.S. Cl.
CPC .......... *F16D 65/562* (2013.01); *F16D 51/24* (2013.01); *F16D 51/16* (2013.01); *F16D 51/18* (2013.01);
(Continued)

(58) Field of Classification Search
CPC .... F16D 65/54; F16D 2125/40; F16D 65/546; F16D 65/568; F16D 65/52;
(Continued)

(56) References Cited

U.S. PATENT DOCUMENTS 2,389,618 A * 11/1945 Goepfrich ............. F16D 65/562
188/196 BA
3,261,435 A * 7/1966 Beatty .................... F16D 51/10
188/195
(Continued)

FOREIGN PATENT DOCUMENTS

AT          334 235       1/1977
DE          1 903 560     1/1970
(Continued)

OTHER PUBLICATIONS

International Search Report issued in PCT/EP2015/001854 dated Mar. 17, 2017.
(Continued)

*Primary Examiner* — Bradley T King
*Assistant Examiner* — Mahbubur Rashid
(74) *Attorney, Agent, or Firm* — Nixon & Vanderhye P.C.

(57) ABSTRACT

The invention relates to an actuating device for an internal shoe brake, including an automatic adjusting device with an adjusting lever which includes a guide track in the form of a guiding slot with two opposing track surfaces which cooperate with opposing sides of a housing-fixed guide element in order to convert a displacement of the adjusting lever relative to the housing-fixed guide element into pivoting movements of the adjusting lever.

6 Claims, 3 Drawing Sheets

(51) Int. Cl.
*F16D 51/24* (2006.01)
*F16D 125/66* (2012.01)
*F16D 51/18* (2006.01)
*F16D 51/20* (2006.01)
*F16D 65/38* (2006.01)
*F16D 65/40* (2006.01)
*F16D 65/52* (2006.01)
*F16D 121/04* (2012.01)
*F16D 127/06* (2012.01)

(52) U.S. Cl.
CPC .............. *F16D 51/20* (2013.01); *F16D 65/38* (2013.01); *F16D 65/40* (2013.01); *F16D 65/52* (2013.01); *F16D 65/56* (2013.01); *F16D 2121/04* (2013.01); *F16D 2125/66* (2013.01); *F16D 2127/06* (2013.01)

(58) Field of Classification Search
CPC ...... F16D 2127/06; F16D 65/56; F16D 65/60; F16D 65/66; F16D 51/20; F16D 65/561
USPC ........................................................ 188/71.8
See application file for complete search history.

(56) References Cited

U.S. PATENT DOCUMENTS

| | | | | |
|---|---|---|---|---|
| 3,265,161 | A * | 8/1966 | Croissant | F16D 65/562 188/196 BA |
| 3,326,331 | A * | 6/1967 | Wallace | F16D 65/22 188/196 BA |
| 3,334,713 | A | 8/1967 | Russell | |
| 3,361,232 | A * | 1/1968 | Engle | F16D 65/66 188/196 BA |
| 3,388,606 | A * | 6/1968 | Hill | F16D 65/22 188/152 |
| 3,545,578 | A * | 12/1970 | Belart | F16D 65/22 188/196 BA |
| 3,599,763 | A * | 8/1971 | Bailey | F16D 51/14 188/326 |
| 3,610,374 | A * | 10/1971 | Troyer | F16D 65/22 188/196 BA |
| 3,712,425 | A * | 1/1973 | Torii | F16D 65/562 188/196 BA |
| 3,765,515 | A * | 10/1973 | Shimada | F16D 65/562 188/196 BA |
| 4,161,999 | A * | 7/1979 | Camph | F16D 65/16 188/196 BA |
| 4,416,356 | A * | 11/1983 | Osborne | F16D 65/562 188/106 A |
| 4,553,646 | A | 11/1985 | Carré et al. | |
| 4,623,046 | A * | 11/1986 | Barnett | F16D 65/565 188/196 BA |
| 4,721,190 | A * | 1/1988 | Schmidt | F16D 65/18 188/196 D |
| 4,770,278 | A * | 9/1988 | Schneider | E05B 63/248 188/343 |
| 4,919,237 | A * | 4/1990 | Yamazaki | F16D 65/562 188/196 M |
| 5,388,671 | A * | 2/1995 | Rupprecht | F16D 65/565 188/196 BA |
| 5,404,971 | A * | 4/1995 | Hayakawa | F16D 65/42 188/196 BA |
| 6,213,258 | B1 * | 4/2001 | Dupuis | F16D 65/563 188/79.51 |
| 2006/0144658 | A1 * | 7/2006 | Tessitore | F16D 51/20 188/325 |

FOREIGN PATENT DOCUMENTS

JP 56018132 A * 2/1981
JP 56143828 A * 11/1981

OTHER PUBLICATIONS

International Preliminary Report on Patentability issued in PCT/EP2015/001854 dated Mar. 28, 2017 (w/ translation).

* cited by examiner

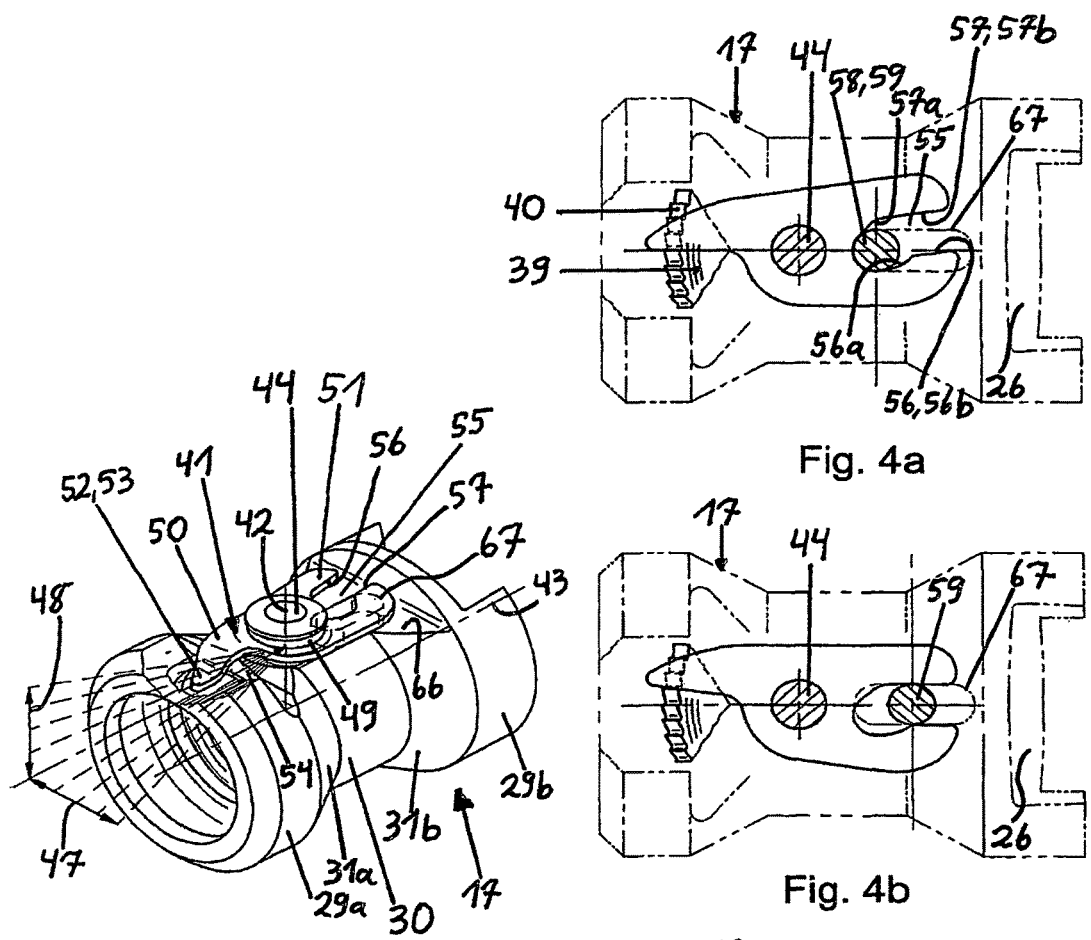
Fig. 3
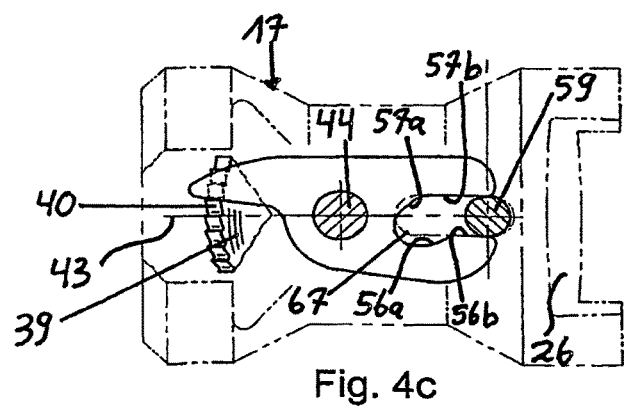
Fig. 4a
Fig. 4b
Fig. 4c

ACTUATING DEVICE FOR AN INTERNAL SHOE BRAKE HAVING AN AUTOMATIC ADJUSTING DEVICE

This application is the U.S. national phase of International Application No. PCT/EP2015/001854 filed Sep. 16, 2015 which designated the U.S. and claims priority to 10 2014 013 868.2 filed Sep. 24, 2014, the entire contents of each of which are hereby incorporated by reference.

The invention relates to an actuating device for an internal expanding shoe brake, comprising a housing, at least one expansion piston movably mounted in the housing and an automatic adjusting device according to the preamble of claim 1.

An actuating device of this type, which is used in a wedge-actuated brake, is known from U.S. Pat. No. 4,553,646. The actuating unit in this document comprises one adjusting nut on each side which is rotatably mounted in an expansion piston and in the self-locking internal thread of which an adjusting bolt is screwed. The outer end of the adjusting bolt is non-rotationally connected to a brake shoe web. In order to compensate for the wear of the friction linings on the relevant brake shoes, an automatic adjusting device is provided which comprises an adjusting lever pivotally mounted on the expansion piston. The adjusting lever is designed as a pivot lever that is mounted on one side and comprises a pawl at one end which interacts with a ratchet connected to the adjusting nut such that a pivoting movement of the adjusting lever causes the ratchet and thus the adjusting nut to rotate when the air gap between the brake shoes and the shoe drum exceeds a predetermined size. In the document mentioned, the adjusting lever is acted upon in the pivoting direction by a spring such that a curved side surface of the adjusting lever is pressed against a bolt fixed to the housing. In this way, the adjusting lever is pivoted when the adjusting lever, during a braking process, is axially pushed together with the expansion piston relative to the housing and thus relative to the bolt fixed to the housing. The adjusting lever is pivotally mounted by means of a pivot pin which has a guide head that projects beyond the adjusting lever and is guided so as to be movable longitudinally in a longitudinal groove in the housing and as a result prevents the expansion piston from rotating.

A drawback of this known adjusting apparatus is that the lateral guide surface of the adjusting lever is not always reliably secured by the spring to the bolt fixed to the housing. When vibrations due to use occur, such an arrangement can lead to the adjusting lever lifting from the bolt fixed to the housing and thus to uncontrollable adjustment behaviour. The same cam slides on the bolt fixed to the housing for both the extension and retraction of the expansion piston, in order to convert the axial movement into a rotational movement. As a result, optimum force/displacement courses cannot be achieved. In addition, the pawl of the adjusting lever being able to pass over a plurality of teeth of the adjusting nut, leading to too large a distance being compensated for, cannot be excluded, in particular when there are vibrations due to use. During prolonged braking, such behaviour can lead to the brake locking. Another drawback is that the bolt fixed to the housing has to be arranged laterally adjacently to the adjusting lever and thus off-centre, which increases the space required. An additional drawback is that the guide groove for the head of the pivot bearing present in the housing in the region of the cylindrical hole weakens the housing in this region and decreases the area of the surface in contact with the expansion piston, as a result of which the wear is increased.

The object of the invention is therefore that of providing an actuating device of the type mentioned at the outset which comprises an automatic adjusting device, is simply and cost-effectively constructed and at the same time makes possible a particularly reliable, precise and easily maintainable adjustment of the brake shoe air gap.

This object is achieved according to the invention by an actuating device having the features of claim 1. Advantageous embodiments of the invention are described in the rest of the claims.

The actuating device according to the invention comprises a housing, at least one expansion piston movably mounted in the housing, and an automatic adjusting device. The adjusting device comprises an adjusting bolt which can be moved relative to the expansion piston in the axial direction and comprises a screw shank that extends into the expansion piston, and a head portion that is operatively connected to a brake shoe. In addition, the adjusting device comprises a rotatably mounted adjusting nut which is arranged at least in part inside the expansion piston and is in threaded engagement with the screw shank, and an adjusting lever which is pivotally mounted on the expansion piston, can be moved therewith relative to the housing and is in engagement with the adjusting nut in order to rotate said nut relative to the adjusting bolt. The adjusting device further comprises a guide element fixed to the housing, with which guide element the adjusting lever interacts such that a movement of the adjusting lever relative to the guide element causes a pivoting movement of the adjusting lever. The adjusting lever comprises a guide link in the form of a guide slot having two opposing link surfaces that interact with opposing sides of the guide element fixed to the housing in order to convert the axial movement of the adjusting lever relative to the guide element fixed to the housing into pivoting movements of the adjusting lever.

The adjusting device according to the invention has the advantage that the pivoting movement of the adjusting lever that causes the rotation of the adjusting nut can be produced solely by the link surfaces of the adjusting lever, which interact with the guide element fixed to the housing and act on either side, during the axial movement of the expansion piston, without any additional spring force. Since the adjusting lever is laterally guided on either side of the guide element fixed to the housing, when vibrations due to use occur it is also not possible for a link surface of the adjusting lever to be removed from the guide element fixed to the housing in an undesired manner and for an uncontrolled pivoting movement to be carried out. The pivoting movement of the adjusting lever is thus controlled on the basis of the axial position of the expansion piston in a very precise and reliable manner. The guide element fixed to the housing, which can consist in particular of a pin or bolt arranged transversely to the longitudinal axis of the expansion piston, does not have to be arranged laterally adjacently to the adjusting lever, but rather can be arranged in particular in the central longitudinal plane of the expansion piston. As a result, no additional space is required laterally adjacent to the adjusting lever for the guide element fixed to the housing.

According to an advantageous embodiment, the adjusting lever comprises an end portion having a pawl, which is in engagement with the adjusting nut, in order to rotate the adjusting nut, while the guide slot is arranged in a portion of the adjusting lever remote from the end portion, the adjusting lever being mounted by means of a pivot bearing which is located between the end portion supporting the pawl and the remote portion. In this case, the adjusting lever thus consists of a two-arm pivot lever comprising opposing lever arms and a pivot bearing arranged therebetween. As a result, a space-saving arrangement can be provided in a simple manner, it being possible to achieve a predetermined translation of the pivot path owing to the length of the lever arms.

According to an advantageous embodiment, the link surfaces comprise a first link surface portion which extends at an angle or arcuately to the longitudinal axis of the expansion piston, and a second link surface portion which, in a predetermined pivoted position of the adjusting lever, extends in parallel with the longitudinal axis of the expansion piston in order to prevent the adjusting lever from pivoting by means of the second link surface portion during an axial movement of the expansion piston. As a result, a type of "freewheel" is produced in a simple manner, as a result of which there is no further pivoting of the adjusting lever from a given axial movement path of the expansion piston. As a result, the pawl of the adjusting lever can be prevented from skipping over a plurality of teeth of the adjusting nut in an undesired manner and the adjusting bolt can be prevented from being adjusted too far.

According to an advantageous embodiment, the guide element fixed to the housing projects into a cylindrical hole in the housing, in which cylindrical hole the expansion piston is arranged, the expansion piston comprising a longitudinal groove or slot in which the guide element engages in order to prevent the expansion piston from rotating inside the housing. As a result, the expansion piston is non-rotatably secured in the cylindrical hole in the housing in a simple manner, without the wall of the housing needing to be weakened by a longitudinal groove. This is particularly advantageous in the case of a wedge-actuated brake since the expansion wedge exerts a tilting moment on the expansion piston, which tilting moment must be absorbed by the housing in the region of the cylindrical hole and leads to high surface pressures in specific regions of the cylindrical hole. The housing can absorb these high surface pressures without damage when no guide grooves that reduce the area of contact surfaces between the expansion piston and the housing are provided in these regions.

According to an advantageous embodiment, the expansion piston comprises two end portions having larger outer diameters and a central portion having a smaller outer diameter, the expansion piston being mounted by the end portions so as to be axially movable in the housing and the adjusting lever being mounted in the region of the central portion. As a result, it is possible to arrange the adjusting lever and the pivot bearing so deep, i.e. radially, within the outer diameter of the end portions that the adjusting lever and the pivot bearing do not project radially outwards beyond the two end portions. As a result, it is possible to provide a very compact construction of the expansion piston and the adjusting lever in a very simple manner.

According to an advantageous embodiment, the adjusting nut comprises a ratchet or is connected to a ratchet for conjoint rotation, which is arranged inside the expansion piston, the expansion piston comprising a recess through which the end portion of the adjusting lever that comprises the pawl extends in order to enter into engagement with the ratchet. As a result, it is possible for the adjusting lever to be coupled in a simple manner with the ratchet arranged in particular completely inside the expansion piston. In addition, the adjusting nut can be mounted by its two end portions in the expansion piston, the ratchet then being arranged between the two end portions of the adjusting nut. As a result, the adjusting nut has a short, compact design and is mounted in a very precise manner.

The invention is explained in greater detail by way of example in the following on the basis of the drawings, in which:

FIG. 3 is a three-dimensional, partially cut-out view of an expansion piston with an adjusting lever mounted thereon; and FIGS. 4a to 4c are plan views of the expansion piston and the adjusting lever in three different axial positions of the expansion piston relative to a guide element fixed to the housing.

FIG. 1 shows essential parts of an internal expanding shoe brake 1 in the form of a wedge-actuated simplex brake. However, the invention is not limited to wedge-actuated simplex brakes of this type, but may also be used for other types of internal expanding shoe brakes, for example duplex brakes or power-assisted brakes.

Figure 1:
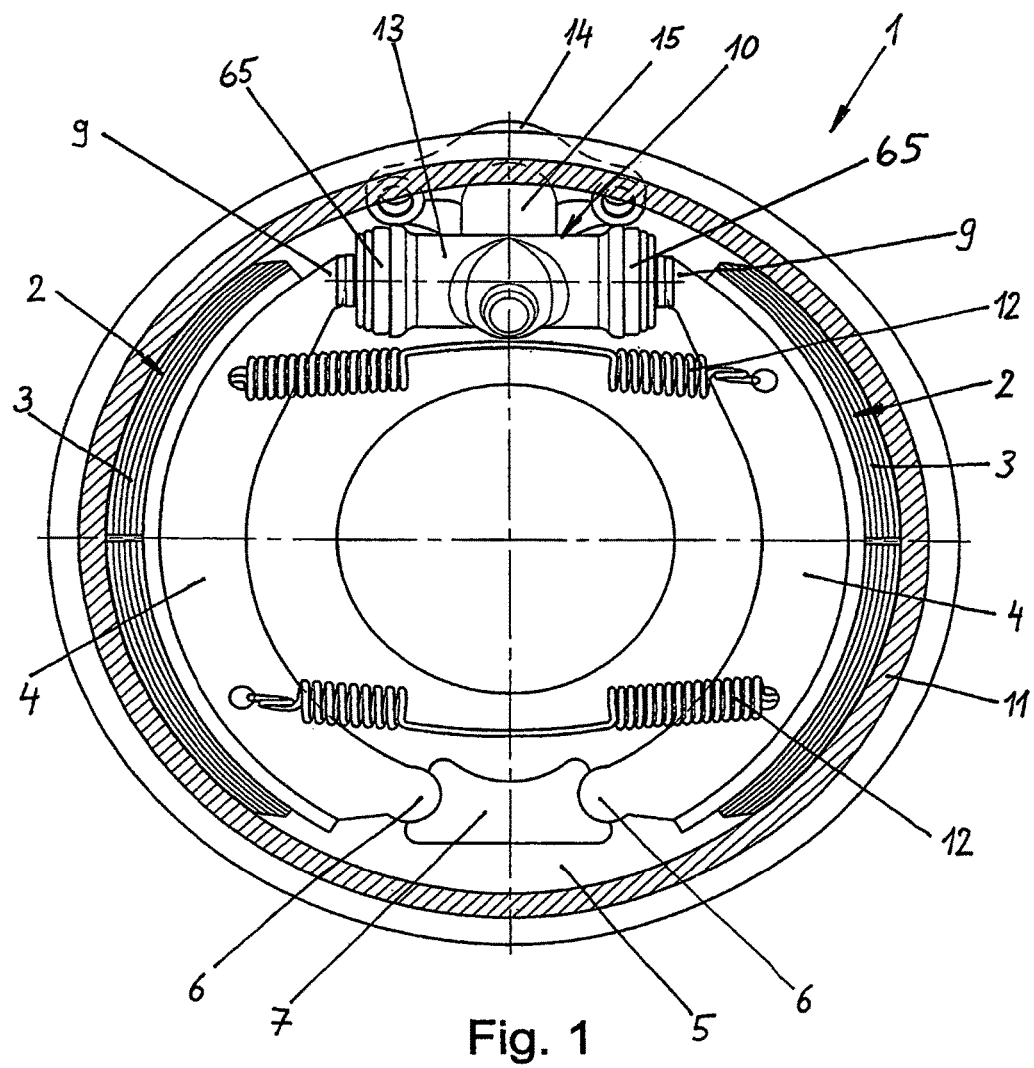
FIG. 1 is a side view of an internal expanding shoe brake comprising an actuating device according to the invention, in which individual parts have been shown in a simplified manner or omitted for the sake of clarity.

Two brake shoes 2 of the internal expanding shoe brake 1 each comprise, in a conventional manner, a friction lining 3 and one or two brake shoe webs 4. The lower ends 6 of the brake shoe webs 4 are pivotally supported on a support bearing 7, which is fastened to a backing plate 5.

By contrast, the upper ends 9 of the brake shoe webs 4 are supported on an actuating device 10, which is designed as a wedge-actuated device in the embodiment shown, and said ends can be pushed laterally outwards by said wedge-actuated device in order to press the friction linings 3 against the circumferential wall of a brake drum 11 and in order to thereby carry out a braking process. In order to retract the brake shoes 2 into their non-braking starting position, two shoe return springs 12 are provided which are hooked onto the opposing brake shoe webs 4 and pull the brake shoes 2 together.

The actuating device 10 comprises a housing 13 that is rigidly connected to the backing plate 5. The housing 13 comprises a T-shaped portion, which extends from the backing plate 5 into the space surrounded by the brake drum 11, and an outer flange portion 14, which is arranged on the opposite side of the backing plate 5 and is used to fasten a brake cylinder (not shown).

Figure 2:
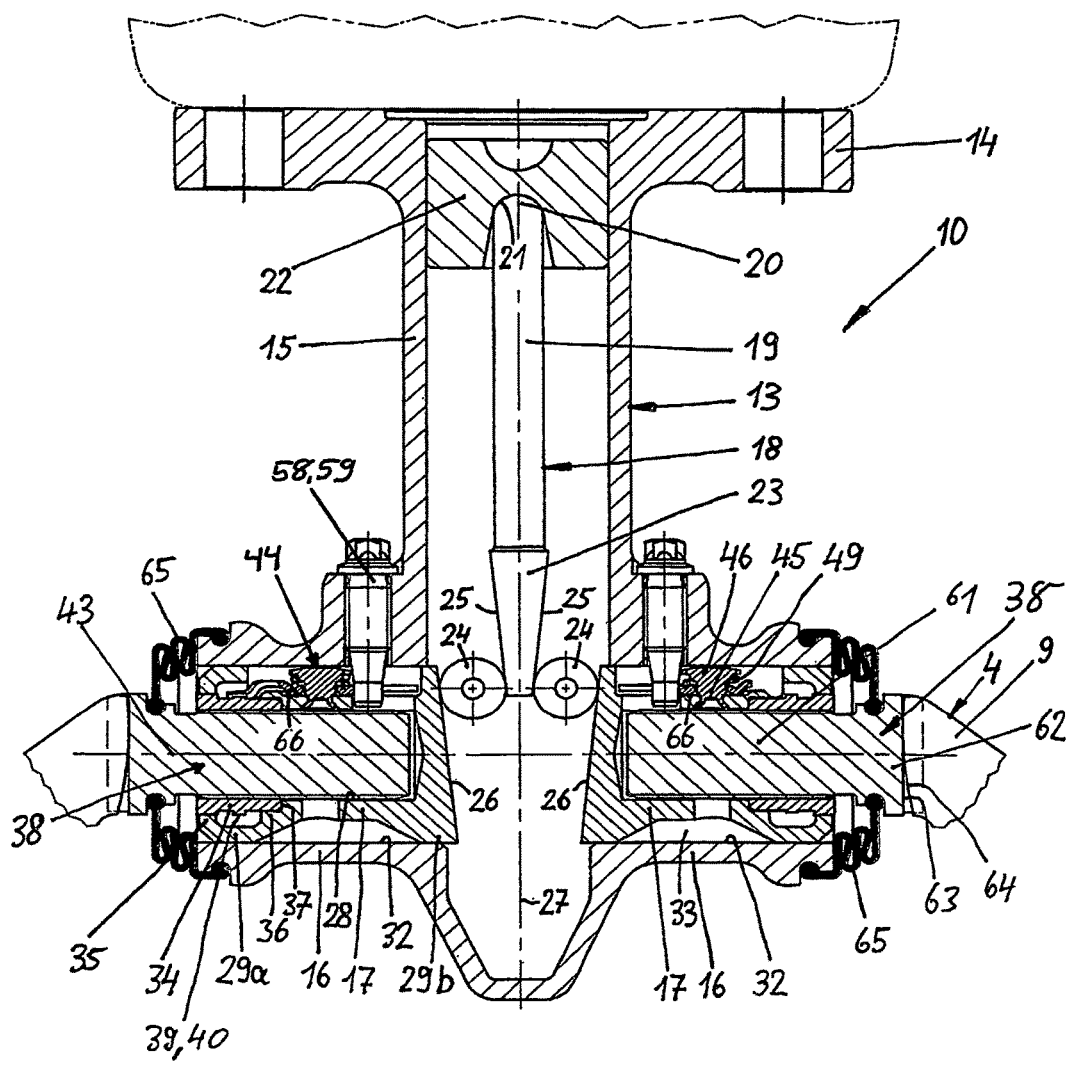
FIG. 2 is a section through the actuating device from FIG. 1.

As can be seen from FIG. 2, the housing 13 comprises a central, hollow cylindrical guide portion 15, to the outer end of which the flange portion 14 is connected, while two cylinder portions 16 extend laterally outwards in opposite directions and at right angles to the guide portion 15 from the opposite end of said housing located within the brake. The cylinder portions 16 each comprise a cylindrical hole 32 in which a non-rotational expansion piston 17 is mounted so as to be axially movable.

The expansion piston 17 is moved by means of a pressure wedge 18, which can be moved longitudinally in the guide portion 15. The pressure wedge 18 comprises a shank 19 having a hemispherical end 20, which is hingedly mounted in a concave depression 21 in a piston 22.

The piston 22 is movably mounted within the guide portion 15 of the housing 13 and is moved by the brake cylinder (not shown).

The pressure wedge 18 comprises a wedge portion 23 on the opposite end. The wedge portion 23 engages between two rollers 24, which are positioned within the housing 13 by a cage (not shown) such that they can move between the two expansion pistons 17 in the movement direction of the pressure wedge 18.

The rollers 24 each rest on an oblique surface 25 of the wedge portion 23 as well as on an oblique surface 26 of the expansion pistons 17. Since the inclination of the oblique surfaces 25 corresponds to the inclination of the opposite oblique surfaces 26, the rollers 24 can roll between parallel oblique surfaces. If the pressure wedge 18 is pushed forwards, i.e. moved downwards in FIG. 2, the expansion pistons 17 are spread apart by the rollers 24, i.e. moved laterally outwards in opposite directions.

The housing 13 and the elements received therein are symmetrical to a central plane 27 of the actuating device 10.

The expansion pistons 17 are cup-like and have a stepped cylindrical hollow space 28 that extends in the axial direction. This hollow space 28 is open towards the laterally outer end face of the expansion piston 17. Furthermore, the outer shape of the expansion piston 17 is substantially stepped cylindrical. As can be seen in particular from FIG. 3, the expansion piston 17 comprises two cylindrical end portions 29a, 29b having a larger outer diameter and a central portion 30 having a reduced outer diameter. The central portion 30 transitions, via conical surfaces 31a, 31b, into the end portions 29a, 29b. The piston 17 thus has a tapered, hourglass-like shape. The circumferential walls of the end portions 29a, 29b act as bearing surfaces, by means of which the expansion piston 17 is mounted in the cylindrical hole 32. However, there is a free annular space 33 between the central portion 30 and the wall of the cylindrical hole 32.

As can be seen from FIG. 2, an adjusting nut 34 can be mounted rotatably, yet in an axially immovable manner, within the cylindrical hollow space 28 in the expansion piston 17 in the region of the end portion 29a. For this purpose, the expansion piston 17 comprises an axially outer bearing flange 35 and an axially inner bearing flange 36. An outer end portion of the adjusting nut 34 is mounted in the outer bearing flange 35, while an inner end portion of the adjusting nut 34 is mounted in the inner bearing flange 36. A diametric step of the expansion piston 17 that projects inwards and connects to the inner bearing flange 36 forms a shoulder and thus an axial abutment surface 37, on which the adjusting nut 34 is supported axially inwardly.

The adjusting nut 34 is provided with a self-locking internal thread into which an adjusting bolt 38 is screwed. In the region between its end portions, the adjusting nut 34 further comprises an outer gearwheel or ratchet 39 comprising teeth 40 (see also FIGS. 4a to 4c). In the embodiment shown, the ratchet 39 is integrally formed with the adjusting nut 34. However, it is also possible to form the ratchet 39 and the adjusting nut 34 separately and to connect them for conjoint rotation. In the axial direction, the ratchet 39 is located in the region of the end portion 29a of the expansion piston 17. There is a free radial space between the ratchet 39 and the inner wall of the end portion 29a.

As can be seen from FIGS. 2 and 3, an adjusting lever 41 is pivotally mounted on the outside of the expansion piston 17. The pivot axis 42 extends perpendicularly to the longitudinal axis 43 of the expansion piston 17 and is arranged in the central longitudinal plane of the expansion piston 17. In the present embodiment, the bearing element consists of a clinch bolt 44 which is anchored in the central portion 30 of the expansion piston 17 and protrudes outwards beyond the central portion 30 in the radial direction. The clinch bolt 44 is short enough that it does not protrude radially outwards beyond the outer circumference of the end portions 29a, 29b and it can be moved together with the expansion piston 17 within the cylindrical hole 32, without touching the circumferential surface of the cylindrical hole 32.

As can be seen from FIG. 2, the clinch bolt 44 comprises a cylindrical bearing portion 45 that connects to the expansion piston 17, and a head 46 having a larger diameter. The bearing portion 45 acts as a pivot bearing for the adjusting lever 41, which comprises a bearing hole for this purpose that is slightly larger than the diameter of the bearing portion 45. As a result, the adjusting lever 41, as can be seen from FIG. 3, can be pivoted in both a first plane (main pivot plane) which is perpendicular to the pivot axis 42 and in which the double-headed arrow 47 lies, and a plane perpendicular hereto, which is illustrated by the double-headed arrow 48.

The adjusting lever 41 is pivotally fixed to the expansion piston 17 by means of a pressure spring 49. The pressure spring 49 wraps around the clinch bolt 44 and is supported on the head 46 on one side, while on the other side it presses on the adjusting lever 41 and presses said lever against a planar surface 66 (FIG. 2) which is in the circumferential region of the clinch bolt 44 in the central portion 30 of the expansion piston 17 and extends into the region of the conical surface 31a, 31b (FIG. 3).

As can be seen from FIGS. 3 and 4a to 4c, the adjusting lever 41 comprises a first arm 50, which extends outwards from the clinch bolt 44 in a substantially axial direction of the expansion piston 17, and a second arm 51, which extends from the clinch bolt 44 in the opposite direction. The first arm 50 ends in an end portion 52 comprising a pawl 53 which is arranged and designed such that it extends beyond the ratchet 39 and enters into engagement therewith. To make this possible, a window-like recess 54 is provided in the wall of the expansion piston 17 in the region of the conical surface 31a, through which recess the first arm 50 can pass such that its end portion 52 can extend into the hollow space 28 in the expansion piston 17. The recess 54 is large enough that the required pivoting movements of the adjusting lever 41 are not impeded. It should be noted that in FIG. 3 the end portion 29a is only shown in a cut-out manner to give a clearer view in the region of the circumferential wall of the end portion 29a, although the recess 54 is actually only provided laterally adjacently to this circumferential surface in the region of the conical surface 31a, meaning that the circumferential surface of the end portion 29a is designed as a continuous, circumferential bearing surface.

The second arm 51 of the adjusting lever 41 is forked and has a guide link in the form of a guide slot 55 acting on either side and comprising two opposing curved link surfaces 56, 57. A guide element 58 fixed to the housing projects into this guide slot 55 in the form of a pin 59. As can be seen from FIG. 2, said pin 59 is a screw pin, the longitudinal axis of which is arranged in parallel with the pivot axis 42 (FIG. 3) of the clinch bolt 44. The pin 59 is screwed into the housing 13 near to the guide portion 15 and can be accessed from the outside. The inner end of the pin 59 extends into the cylindrical hole 32 and into the guide slot 55 in the adjusting lever 41.

As can be seen from FIGS. 4a to 4c, the link surfaces 56, 57, i.e. the sides of the guide slot 55, form two different link cams, by means of which the adjusting lever 41 is in sliding contact with the pin 59 fixed to the housing. The first link surface 56 comprises a first link surface portion 56a (FIG. 4c), which extends so as to be curved at an angle to the longitudinal axis 43 of the expansion piston 17. A second link surface portion 56b connects to said first link surface portion 56a and extends in parallel with the longitudinal axis 43 in the pivoted positions which are shown in FIGS. 4b and 4c.

The shape of the second link surface 57 is different from that of the first link surface 56. The link surface 57 comprises a first link surface portion 57a, which extends at an angle to the longitudinal axis 43, and a second link surface portion 57b, which extends in parallel with the link surface portion 56b and thus in parallel with the longitudinal axis 43 of the expansion piston 17 in a predetermined pivoted position of the adjusting lever 41. In the region of the first link surface portions 56a, 57a, the adjusting lever 41 is then in guiding engagement with the pin 59 when the distance to be travelled by the expansion piston 17 during a braking process is relatively short, while the second link surface portions 56b, 57b are in guiding engagement with the pin 59 when the expansion piston 17 is extended relatively far out of the cylindrical hole 32 in the housing 13. Depending on the shape of the curve on the adjusting lever 41, as long as the pin 59 is located in the region of the first link surface portions 56a, 57a, the axial movement of the expansion piston 17 is converted into a pivoting movement (in the main pivot plane, which is shown by the double-headed arrow 47 in FIG. 3) by the pin 59 fixed to the housing. However, if the pin 59 is located in the region of the second link surface portions 56b, 57b, no further pivoting movement of the adjusting lever 41 occurs when the expansion piston 17 is moved axially. As a result, a type of "freewheel" is produced, which prevents the adjusting lever 41 from rotating undesirably far during a large axial movement of the expansion piston 17. The adjusting process will be described later in more detail.

As can also be seen from FIG. 2, an adjusting bolt 38 is screwed into the adjusting nut 34 of any given expansion piston 17. For this purpose, the adjusting bolt 38 comprises a screw shank 61, which interacts with the internal thread of the adjusting nut 34 and extends into the cylindrical hollow space 28 in the expansion piston 17, and an outer head portion 62, which projects beyond the outer end face of the expansion piston 17. The adjusting bolt 38, adjusting nut 34, expansion piston 17 and cylinder portion 16 of the housing 13 are arranged coaxially with one another and have the same longitudinal axis 43.

The outwardly facing planar end face 63 of the adjusting bolt 38 lies on a radially shaped contact surface 64 of the brake shoe web(s) 4 and is axially held in position by the force of the shoe return spring(s) 12 in a frictionally engaged manner. The adjusting nut 34 and the adjusting bolt 38 form a spindle system in order to unscrew the adjusting bolt 38 by automatic rotation of the adjusting nut 34 out of the cylindrical hole 32 in the case of increasing wear of the brake lining 3 and in order to thereby keep the brake shoe air gap at a constant, desired value. For this purpose, it is necessary for the adjusting bolt 38 to be non-rotationally arranged relative to the housing 13. The adjusting bolt 38 is fixed against rotation in the embodiment shown by means of a groove in the head portion 62 in which the upper end 9 of the brake shoe web 4 engages. The play between the side walls of the groove and the brake shoe web 4 allows a relative movement of the brake shoe web 4, which is required for pivoting the brake shoes 2.

As can also be seen from FIG. 2, a circumferential groove is located in the region of the head portion 62 of the adjusting bolt 38 and radially further outwards on the housing 13. A resilient and temperature-resistant bellows 65 is inserted into these grooves and seals the actuating device 10 and in particular the entire adjusting device from the surroundings. After removing the shoe return spring(s) 12 and pivoting the brake shoes 2 outwards, it is possible to manually reset the adjusting bolt 38 by screwing it into the cylindrical hollow space 28 in the expansion piston 17. For this purpose, it can be expedient to arrange the bellows 65 rotatably on the housing 13 or on the adjusting bolt 38.

The manner in which the automatic adjusting device operates is described in more detail in the following:

The pressure spring 49 exerts a compressive force on the adjusting lever 41, which is of such a kind that the pawl 53 of the adjusting lever 41 is guided onto the saw-tooth-like teeth 40 of the ratchet 39 in the entire working range. At the start of a braking process, the compressive force acting in the axial direction of the expansion piston 17 increases and causes distortion of the components between the brake shoes 2 and thus causes locking of the adjusting nut 34 owing to the self-locking thread between the adjusting nut 34 and the adjusting bolt 38. If the distance covered by the expansion piston 17 during a braking process is small, such that the air gap does not need to be adjusted, the adjusting lever 41 is only pivoted by means of the first link surface portion 56a so far clockwise (FIG. 4a) that the pawl 53 of the adjusting lever 41 slides upwards over the planar contour of the tooth 40 of the ratchet 39 and slides downwards again after the braking operation has finished, without skipping over said tooth 40. However, if the distance covered by the expansion piston 17, as shown in FIG. 4b, is, due to the air gap of a brake shoe 2 being too large, so large that an entire tooth 40 of the ratchet 39 is to be passed over, the adjusting lever 41 is pivoted by means of the link surface portion 56a so far clockwise that the pawl 53 of the adjusting lever 41 slides upwards over the planar contour of the tooth 40 of the ratchet 39 until the edge thereof on the steep contour of the tooth 40 falls downwards by the tooth height, i.e. engages in the depression of the next tooth. If the distance covered by the expansion piston 17 is even larger, the pin 59 fixed to the housing reaches the region of the second link surface portion 56b, as shown in FIG. 4b. However, if the expansion piston 17 is pushed further outwards, as shown in FIG. 4c, there is no further pivoting movement of the adjusting lever 41 since the second link surface portion 56b extends in parallel with the longitudinal axis 43 of the expansion piston 17. As a result, it is ensured that the adjusting lever 41 only ever further rotates the ratchet 39 and thus the adjusting nut 34 by one tooth 40.

When the operation of the actuating unit 10 has finished, the axial compressive force is reduced to its initial value, which is determined by the shoe return spring(s) 12. The locking action of the adjusting nut 34 is thus cancelled. The resulting lateral compressive force of the pin 59 fixed to the housing on the opposite second link surface 57 on the adjusting lever 41 moves the adjusting lever 41 in the opposite pivoting direction, i.e. in FIGS. 4a to 4c, in the anti-clockwise direction, back into its starting position. In the process, the pawl 53 presses against the steep contour of the tooth 40 and thus turns the ratchet 39 and the adjusting nut 34, leading to the adjusting bolt 38 being unscrewed and thus the air gap of the particular brake shoe 2 being decreased.

The rotational movement of the adjusting nut 34 thus causes an axial movement of the adjusting bolt 38 by means of the interacting threads of the adjusting nut 34 and the adjusting bolt 38. The distance to be allowed for until the wear limit of the friction lining 3 is reached specifies the maximum screwable thread length of the adjusting bolt 38 and the maximum length of extension of the bellows 65.

As the wear of the friction lining 3 increases, the contact point between the adjusting bolt 38 and the brake shoe web(s) 4 moves towards the support bearing 7 of the brake shoes 2. If both friction linings 3 are worn evenly or down to halfway, the contact point is ideally located at the level of the central axis, i.e. the longitudinal axis 43 of the adjusting bolt 38, during braking.

Simultaneously, the pin 59 fixed to the housing serves to prevent the expansion piston 17 from rotating within the cylindrical hole 32. For this purpose, the expansion piston 17 comprises a longitudinal slot (67) in the region below the guide slot 55 in the adjusting lever 41, into which longitudinal slot the end portion of the pin 59 projects. It is therefore not necessary for the cylindrical hole 32 to comprise a guide groove in order to prevent the expansion piston 17 from rotating.

It can be seen that, for the adjusting device according to the invention, the force for rotating the adjusting nut 34 is applied solely by the force of the shoe return springs 12 that are already present. Additional, separate springs are not required for this purpose. The force of the pressure spring 49 mounted on the clinch bolt 44 is used exclusively to keep the pawl 53 of the adjusting lever 41 in engagement with the toothing 40 of the ratchet 39 and makes it possible for the adjusting lever 41 to move, as required for this purpose, in the radial direction of the expansion piston 17, i.e. in the direction of the double-headed arrow 48 (FIG. 3), in parallel with the direction of the pivot axis 42.

Since all the components of the adjusting device are located inside the actuating unit 10, the components hardened according to the requirements thereof can be additionally durably lubricated in order to reduce wear. All of the components are designed such that they can be produced in the simplest manner and are easily assembled. The construction is symmetrical to the central plane 27.

The adjusting device according to the invention results in a simple variation of the air gap and a clearly structured adjusting process which consists of a switching process when the expansion pistons 17 move apart and a setting process when the expansion pistons 17 move back. Both the switching process and the setting process can be precisely determined by means of the targeted shape of the link surfaces 56, 57. In this case, the guide slot 55 acting on either side prevents undesired deviation from the predetermined pivoting movement of the adjusting lever 41 in a simple and reliable manner.

In the context of the invention, a plurality of variations is possible. The guide element 58 fixed to the housing does not have to be a cylindrical pin 59. It is also possible to use guide elements in other shapes which can fulfil the function of a link block. Instead of the clinch bolt 44, other bearing elements may also be used for mounting the adjusting lever 41, for example bearing journals which are screwed or welded to the expansion piston 17.

The invention claimed is:

1. An actuating device for an internal expanding shoe brake, comprising a housing, at least one expansion piston movably mounted in the housing and an automatic adjusting device, the adjusting device comprising:
   an adjusting bolt, which can be moved relative to the expansion piston in an axial direction and comprises a screw shank that extends into the expansion piston, and a head portion that is operatively connected to a brake shoe,
   a rotatably mounted adjusting nut which is arranged at least in part inside the expansion piston and is in threaded engagement with the screw shank,
   an adjusting lever which is pivotally mounted on the expansion piston, can be moved therewith relative to the housing and is in engagement with the adjusting nut in order to rotate said nut relative to the adjusting bolt, and
   a guide element fixed to the housing, with which guide element the adjusting lever interacts such that a movement of the adjusting lever relative to the guide element causes a pivoting movement of the adjusting lever,
   wherein the adjusting lever comprises a guide link in the form of a guide slot having two opposing link surfaces that interact with opposing sides of the guide element fixed to the housing in order to convert the movement of the adjusting lever relative to the guide element fixed to the housing into pivoting movements of the adjusting lever,
   wherein the adjusting lever comprises an end portion having a pawl, which is in engagement with the adjusting nut, in order to rotate the adjusting nut on the basis of the pivoting movement of the adjusting lever, while the guide slot is arranged in a portion of the adjusting lever remote from the end portion, the adjusting lever being mounted by means of a pivot bearing which is located between the end portion and the remote portion, and
   wherein the adjusting nut comprises a ratchet or is connected to a ratchet for conjoint rotation, the ratchet being arranged inside the expansion piston, the expansion piston comprising a recess through which the end portion of the adjusting lever that comprises the pawl extends in order to enter into engagement with the ratchet.

2. The actuating device according to claim 1, wherein the link surfaces comprise a first link surface portion which extends at an angle or arcuately to an longitudinal axis of the expansion piston, and a second link surface portion which, in a predetermined pivoted position of the adjusting lever, extends in parallel with the longitudinal axis of the expansion piston in order to prevent the adjusting lever from pivoting by means of the second link surface portion during an axial movement of the expansion piston.

3. The actuating device according to claim 1, wherein the guide element fixed to the housing can be arranged to project into in the expansion piston.

4. The actuating device according to claim 1, wherein the guide element fixed to the housing projects into a cylindrical hole in the housing, in which cylindrical hole the expansion piston is arranged, the expansion piston comprising a longitudinal groove or slot in which the guide element engages in order to prevent the expansion piston from rotating inside the housing.

5. The actuating device according to claim 1, wherein the guide element fixed to the housing consists of a pin or bolt arranged transversely to a longitudinal axis of the expansion piston.

6. The actuating device according to claim 1, wherein the expansion piston comprises two end portions having larger outer diameters and a central portion having a smaller outer diameter, the expansion piston being mounted by the end portions so as to be axially movable in the housing and the adjusting lever being mounted in the region of the central portion.

* * * * *